Figure 1:
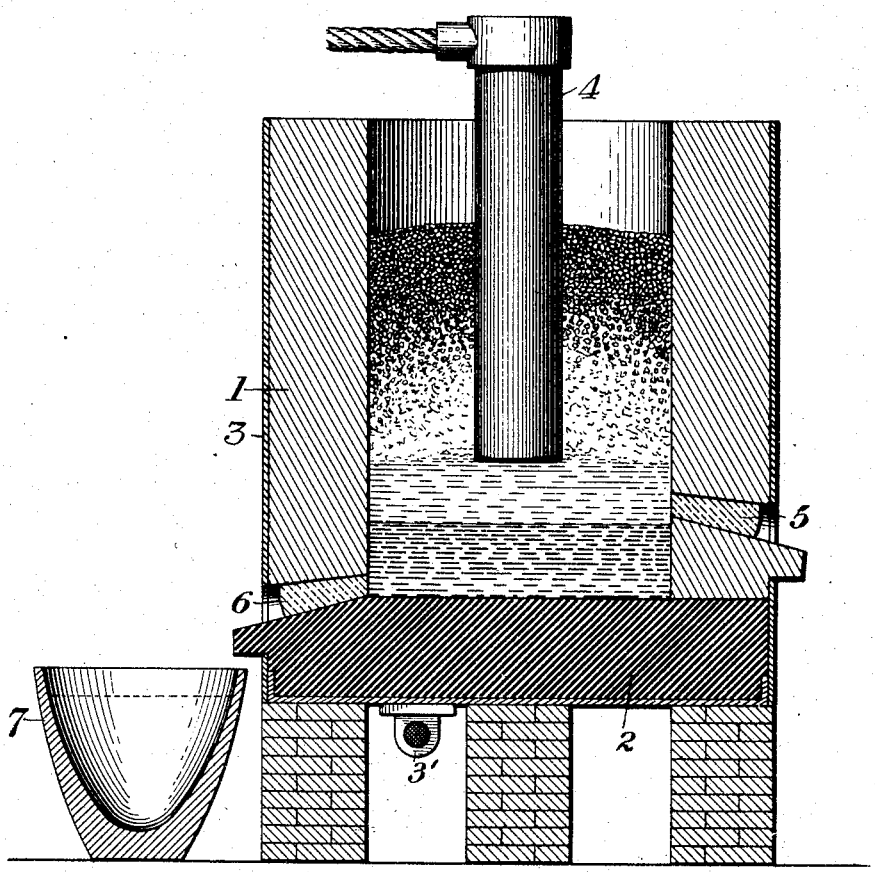

No. 790,395. PATENTED MAY 23, 1905.
E. F. PRICE.
PROCESS OF PRODUCING LOW CARBON METALS OR ALLOYS.
APPLICATION FILED NOV. 22, 1904.

2 SHEETS—SHEET 1.

Witnesses:
R. A. Balderson
J. B. Hill

Inventor:
Edgar F. Price,
by Byrnes & Townsend,
Att'ys.

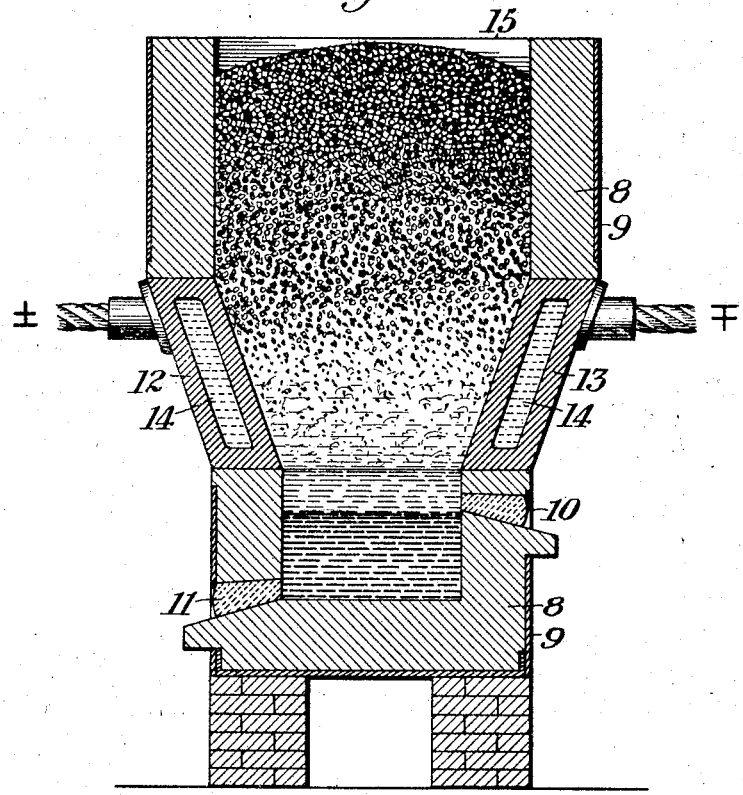

No. 790,395. Patented May 23, 1905.

UNITED STATES PATENT OFFICE.

EDGAR F. PRICE, OF NIAGARA FALLS, NEW YORK.

PROCESS OF PRODUCING LOW-CARBON METALS OR ALLOYS.

SPECIFICATION forming part of Letters Patent No. 790,395, dated May 23, 1905.

Application filed November 22, 1904. Serial No. 233,885.

*To all whom it may concern:*

Be it known that I, EDGAR F. PRICE, a citizen of the United States, residing at Niagara Falls, in the county of Niagara and State of New York, have invented certain new and useful Improvements in Processes of Producing Low-Carbon Metals or Alloys, of which the following is a specification.

In the production of ferrochromium from chromite it is customary to introduce a small charge of the ore, carbon, and a flux into an electric furnace having sides and a hearth of carbon and to spring an arc between the hearth and a depending carbon electrode having its lower end embedded in the charge. A high-potential difference is usually maintained between the terminals of the furnace. As the ore is reduced a layer of the ferrochromium accumulates on the hearth, covered by a layer of slag. The molten alloy is tapped out from time to time until the slag has increased to such an amount as to require removal. As the normal slag has a high fusion-point, a flux is added to render it more liquid, and the remaining alloy and slag are finally run out through the metal tap-hole. The furnace is then charged anew, and the process is repeated.

It is important that the ferrochromium produced should be low in carbon. The amount of carbon in the charge is therefore ordinarily kept at a minimum. On account of the low percentage of admixed carbon, however, highly-oxidizing gases are evolved in contact with the depending electrode, which is soon consumed and must be replaced. The air also acts rapidly on the hot electrode when the furnace is emptied by the removal of slag. Since the charge is a fairly-good conductor of electricity, a thin layer only is maintained around the lower end of the depending electrode to prevent excessive shunting of current to the carbon sides of the furnace under the high applied potential. Much heat is therefore lost by radiation from the zone of reduction through the charge, while the electrode is insufficiently protected from oxidation by the air. This loss of heat greatly decreases the reduction efficiency of the furnace. Furthermore, the slag is not kept at a sufficiently high temperature to permit it to be tapped out, except by adding large amounts of flux, discontinuing the charging of ore, and employing the energy of the arc merely to liquefy the slag. The heat losses are also increased by the discontinuous mode of working, both the furnace and the depending electrode cooling down when the furnace is emptied. It is also impracticable to effect a clean separation of the metal and slag by removing them successively through a single tap-hole.

According to the present invention the production of low-carbon ferrochromium and other metals and alloys is effected by a continuous operation comprising two stages. In the first stage an alloy with a relatively high percentage of carbon is produced by smelting a charge containing sufficient carbon to protect the carbon electrodes. The alloy is tapped from the reduction-furnace and allowed to solidify. The ingot is then broken into fragments, which are mixed with a decarburizing agent—for example, lime—and the mixture is smelted preferably in a furnace in which the charge serves as a resistance-conductor, the carbon reacting on the lime to produce calcium carbid, which is separated from the purified alloy.

Suitable apparatus for carrying out the process is shown in the accompanying drawings, in which—

Figure 1 is a vertical axial section of the reduction-furnace, and Fig. 2 is a transverse vertical section of the decarburizing-furnace.

The reduction-furnace shown in Fig. 1 comprises sides 1, of refractory non-conducting material, such as chromite or magnesia, and a hearth 2, of carbon, surrounded by a metal casing 3, having an electric terminal 3'. The carbon hearth constitutes one electrode. The other electrode is a depending carbon rod 4. Lateral tap-holes 5 6 for the slag and metal, respectively, extend from the lower part of the furnace-chamber. In using this reduction-furnace to carry out the first stage of the process an arc is established between the depending electrode and the carbon hearth and a small amount of the charge—for example, a mixture of chromite, coke, lime, and silica—is fed into the furnace. The furnace is then gradually filled until in its normal working condition the depending electrode is embedded in the charge. As the iron and chromium are reduced superposed layers of alloy and slag collect in the bottom of the furnace. As reduction progresses the slag is withdrawn at intervals through the tap-hole 5 and the alloy is intermittently tapped into a casting-pot 7, fresh charge materials being added as required. In the second stage of the process the cast ingot of high-carbon metal is broken into pieces. The fragments are mixed with the decarburizing agent—for example, lime or fluorspar—and the mixture is fed into the decarburizing-furnace.

While the mixture of the high-carbon alloy and lime may be heated to the reaction temperature in an arc-furnace, it is preferred to employ the resistance-furnace shown in Fig. 2. This furnace has a body 8 of refractory non-conductive material—for example, chromite or magnesia—surrounded by a metal casing 9. Tap-holes 10 11 for the calcium carbid and purified alloy extend through the walls. Electrodes 12 13, preferably of cast-steel, with chambers 14 for the circulation of water, are embedded in or constitute portions of the end walls of the furnace. In use the furnace is nearly filled with a charge 15 of the high-carbon alloy and lime. An electric current is then passed between the electrodes and through the charge, serving as a resistance-conductor, and the charge is thereby heated to the requisite temperature. The carbon in the alloy reacts on the lime with the production of calcium carbid, and the alloy and carbid collect in the bottom of the furnace in superposed layers. The percentage of carbon removed can be regulated by varying the size of the fragments into which the ingot is crushed, the amount of the reagent, and the temperature and duration of the heating. The carbid is withdrawn at intervals through the tap-hole 10 and the purified alloy through the tap-hole 11, fresh portions of the mixture of high-carbon metal and decarburizing agent being added as required. If any calcium carbid runs out with the metal, it is decomposed by treatment with water.

For the purpose of illustration the subdivision of the high-carbon ferrochromium or other metal has been described as effected by casting the metal into an ingot and breaking the ingot into fragments. The subdivision of the metal may obviously be effected by other well-known methods, as by running the molten metal into water, and thereby granulating it.

I claim—

1. The process of producing low-carbon metals or alloys, which consists in first producing a material relatively high in carbon, subdividing the high-carbon product and mixing it with a decarburizing agent capable of producing a non-gaseous carburized by-product, and heating the mixture to the temperature requisite to effect decarburization, as set forth.

2. The process of producing low-carbon metals or alloys, which consists in first producing a material relatively high in carbon, subdividing the high-carbon product and mixing it with a decarburizing agent capable of producing a non-gaseous carburized by-product, and electrically heating the mixture to the temperature requsite to effect decarburization, as set forth.

3. The process of producing low-carbon metals or alloys, which consists in first producing a material relatively high in carbon by electrically smelting a charge containing an excess of carbon, subdividing the high-carbon product and mixing it with a decarburizing agent capable of producing a non-gaseous carburized by-product, and heating the mixture to the temperature requisite to effect decarburization, as set forth.

4. The process of producing low-carbon metals or alloys, which consists in first producing a material relatively high in carbon by electrically smelting a charge containing an excess of carbon, casting the high-carbon product into an ingot, breaking the ingot into fragments, mixing the fragments with a decarburizing agent capable of producing a non-gaseous carburized by-product, and heating the mixture to the temperature requisite to effect decarburization, as set forth.

5. The process of producing low-carbon metals or alloys, which consists in first producing a material relatively high in carbon by electrically smelting a charge containing an excess of carbon, subdividing the high-carbon product and mixing it with a decarburizing agent capable of producing a non-gaseous carburized by-product, and electrically heating the mixture to the temperature requisite to effect decarburization, as set forth.

6. The process of producing low-carbon metals or alloys, which consists in first producing a material relatively high in carbon by electrically smelting a charge containing an excess of carbon, casting the high-carbon product into an ingot, breaking the ingot into fragments, mixing the fragments with a decarburizing agent capable of producing a non-gaseous carburized by-product, and electrically heating the mixture to the temperature requisite to effect decarburization, as set forth.

7. The process of producing low-carbon metals or alloys, which consists in first producing a material relatively high in carbon by electrically smelting a charge containing an excess of carbon, subdividing the high-carbon product and mixing it with a decarburizing agent capable of producing a non-gaseous carburized by-product, electrically heating the mixture to the temperature requisite to effect decarburization, and separating the by-product from the decarburized product, as set forth.

8. The process of producing low-carbon metals or alloys, which consists in first producing a material relatively high in carbon by electrically smelting a charge containing an excess of carbon, subdividing the high-carbon product and mixing it with a decarburizing agent capable of producing a non-gaseous carburized by-product, electrically heating the mixture to the temperature requisite to effect decarburization, and separately removing the by-product and the decarburized product and supplying fresh charge materials as required, as set forth.

9. The process of producing low-carbon metals or alloys, which consists in first producing a material relatively high in carbon by electrically smelting a charge containing an excess of carbon, subdividing the high-carbon product and mixing it with a decarburizing agent containing calcium, heating the mixture to a temperature sufficient to cause the carbon to react with the calcium with the production of calcium carbid, and separating the carbid from the decarburized product, as set forth.

10. The process of producing low-carbon metals or alloys, which consists in first producing a material relatively high in carbon by electrically smelting a charge containing an excess of carbon, subdividing the high-carbon product and mixing it with a decarburizing agent containing calcium, heating the mixture to a temperature sufficient to cause the carbon to react with the calcium with the production of calcium carbid by passing an electric current through the mixture, acting as a resistance-conductor, and separating the carbid from the decarburized product, as set forth.

11. The process of producing low-carbon ferrochromium, which consists in first producing ferrochromium relatively high in carbon, subdividing the high-carbon product and mixing it with a decarburizing agent capable of producing a non-gaseous carburized by-product, and heating the mixture to the temperature requisite to effect decarburization, as set forth.

12. The process of producing low-carbon ferrochromium, which consists in first producing ferrochromium relatively high in carbon, subdividing the high-carbon product and mixing it with a decarburizing agent capable of producing a non-gaseous carburized by-product, and electrically heating the mixture to the temperature requisite to effect decarburization, as set forth.

13. The process of producing low-carbon ferrochromium, which consists in first producing ferrochromium relatively high in carbon by electrically smelting a charge containing an excess of carbon, subdividing the high-carbon product and mixing it with a decarburizing agent capable of producing a non-gaseous carburized by-product, and heating the mixture to the temperature requisite to effect decarburization, as set forth.

14. The process of producing low-carbon ferrochromium, which consists in first producing ferrochromium relatively high in carbon by electrically smelting a charge containing an excess of carbon, casting the high-carbon product into an ingot, breaking the ingot into fragments, mixing the fragments with a decarburizing agent capable of producing a non-gaseous carburized by-product, and heating the mixture to the temperature requisite to effect decarburization, as set forth.

15. The process of producing low-carbon ferrochromium, which consists in first producing ferrochromium relatively high in carbon by electrically smelting a charge containing an excess of carbon, subdividing the high-carbon product and mixing it with a decarburizing agent capable of producing a non-gaseous carburized by-product, and electrically heating the mixture to the temperature requisite to effect decarburization, as set forth.

16. The process of producing low-carbon ferrochromium, which consists in first producing ferrochromium relatively high in carbon by electrically smelting a charge containing an excess of carbon, casting the high-carbon product into an ingot, breaking the ingot into fragments, mixing the fragments with a decarburizing agent capable of producing a non-gaseous carburized by-product, and electrically heating the mixture to the temperature requisite to effect decarburization, as set forth.

17. The process of producing low-carbon ferrochromium, which consists in first producing ferrochromium relatively high in carbon by electrically smelting a charge containing an excess of carbon, subdividing the high-carbon product and mixing it with a decarburizing agent capable of producing a non-gaseous carburized by-product, electrically heating the mixture to the temperature requisite to effect decarburization, and separating the by-product from the decarburized product, as set forth.

18. The process of producing low-carbon ferrochromium, which consists in first producing ferrochromium relatively high in carbon by electrically smelting a charge containing an excess of carbon, subdividing the high-carbon product and mixing it with a decarburizing agent capable of producing a non-gaseous carburized by-product, electrically heating the mixture to the temperature requisite to effect decarburization, and separately removing the by-product and the decarburized product and supplying fresh charge materials as required, as set forth.

19. The process of producing low-carbon ferrochromium, which consists in first producing ferrochromium relatively high in carbon by electrically smelting a charge containing an excess of carbon, subdividing the high-carbon product and mixing it with a decarburizing agent containing calcium, heating the mixture to a temperature sufficient to cause the carbon to react with the calcium with the production of calcium carbid, and separating the carbid from the decarburized product, as set forth.

20. The process of producing low-carbon ferrochromium, which consists in first producing ferrochromium relatively high in carbon by electrically smelting a charge containing an excess of carbon, subdividing the high-carbon product and mixing it with a decarburizing agent containing calcium, heating the mixture to a temperature sufficient to cause the carbon to react with the calcium with the production of calcium carbid by passing an electric current through the mixture, acting as a resistance-conductor, and separating the carbid from the decarburized product, as set forth.

In testimony whereof I affix my signature in presence of two witnesses.

EDGAR F. PRICE.

Witnesses:
C. C. MOSHER,
D. BURGESS.